United States Patent
Sokondar

(10) Patent No.: US 8,315,591 B2
(45) Date of Patent: *Nov. 20, 2012

(54) SYSTEM AND METHOD FOR CONDITIONALLY ATTEMPTING AN EMERGENCY CALL SETUP

(75) Inventor: Eniko Sokondar, Richmond (GB)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,664

(22) Filed: Jul. 1, 2011

(65) Prior Publication Data

US 2012/0003954 A1    Jan. 5, 2012

Related U.S. Application Data

(63) Continuation of application No. 11/620,320, filed on Jan. 5, 2007, now Pat. No. 8,041,331.

(51) Int. Cl.
*H04M 11/04* (2006.01)

(52) U.S. Cl. ............... 455/404.1; 713/155; 713/168; 713/170; 379/37; 379/40; 379/41; 726/12; 370/259

(58) Field of Classification Search ............... 455/404.1, 455/412.2, 420
See application file for complete search history.

(56) References Cited

U.S. PATENT DOCUMENTS

| | | |
|---|---|---|
| 5,467,388 A | 11/1995 | Redd, Jr. et al. |
| 6,397,054 B1 | 5/2002 | Hoirup et al. |
| 6,775,273 B1 | 8/2004 | Kung et al. |
| 6,961,563 B2 | 11/2005 | Holler et al. |
| 7,441,429 B1 | 10/2008 | Nucci et al. |
| 7,467,183 B2 | 12/2008 | Arcuri et al. |
| 7,574,194 B2 | 8/2009 | Yang et al. |
| 7,689,830 B2 | 3/2010 | Ishii |
| 7,783,283 B2 | 8/2010 | Kuusinen et al. |
| 2002/0186683 A1 | 12/2002 | Buck et al. |

(Continued)

FOREIGN PATENT DOCUMENTS

EP    1 691 538 A    8/2006

(Continued)

OTHER PUBLICATIONS

Translation of Office Action cited in corresponding Japanese Patent Application No. 2007-341450 dated Apr. 21, 2011, 4 pages.

(Continued)

*Primary Examiner* — Jinsong Hu
*Assistant Examiner* — Magdi Elhag
(74) *Attorney, Agent, or Firm* — Finnegan, Henderson, Farabow, Garrett & Dunner, LLP

(57) ABSTRACT

A system and method are provided for a communications device to conditionally attempt an emergency call setup. The communications device maintains at least one condition for attempting emergency call setups. Upon receiving a message prompting an emergency call setup, the communications device attempts the emergency call setup only if any of the at least one conditions is satisfied. The at least one condition is defined such that the communications device does not erroneously attempt to establish an emergency call when there is no emergency. The at least one condition might for example include whether the message prompting the emergency call setup indicates a message source that is trusted by the user of the mobile device. A system and method are also provided for a communications network to block at least some of the messages from being delivered to their target communications device.

11 Claims, 9 Drawing Sheets

U.S. PATENT DOCUMENTS

| | | | |
|---|---|---|---|
| 2004/0137873 A1* | 7/2004 | Kauppinen et al. | 455/404.1 |
| 2005/0096008 A1 | 5/2005 | Shin | |
| 2005/0096009 A1* | 5/2005 | Ackley | 455/405 |
| 2005/0101288 A1 | 5/2005 | Hulkkonen et al. | |
| 2006/0153172 A1 | 7/2006 | Yamada et al. | |
| 2006/0236091 A1 | 10/2006 | Kaji et al. | |
| 2007/0092070 A1 | 4/2007 | Croy et al. | |
| 2007/0097967 A1 | 5/2007 | Kauppinen et al. | |
| 2007/0121598 A1 | 5/2007 | McGary | |
| 2007/0121642 A1 | 5/2007 | Battin et al. | |
| 2007/0121798 A1 | 5/2007 | Croy et al. | |
| 2007/0133521 A1 | 6/2007 | McMaster | |
| 2007/0186101 A1 | 8/2007 | Rajko et al. | |
| 2007/0254625 A1 | 11/2007 | Edge | |
| 2007/0274289 A1 | 11/2007 | Buckley et al. | |
| 2008/0009262 A1 | 1/2008 | Rudolf et al. | |
| 2008/0034401 A1 | 2/2008 | Wang | |
| 2008/0039085 A1 | 2/2008 | Phan-Anh | |
| 2008/0107243 A1 | 5/2008 | Terrill et al. | |
| 2008/0222724 A1 | 9/2008 | Ormazabal et al. | |
| 2008/0261557 A1 | 10/2008 | Sim | |
| 2008/0304630 A1 | 12/2008 | Nguyen et al. | |
| 2009/0270064 A1 | 10/2009 | Kunniyur et al. | |

FOREIGN PATENT DOCUMENTS

| | | | |
|---|---|---|---|
| JP | 2006 270558 A | | 10/2005 |
| JP | 2006 080962 A | | 3/2006 |
| JP | 2006-276093 A | | 10/2006 |
| JP | 2006 287798 A | | 10/2006 |
| KR | 10-2005-0049151 | | 11/2003 |
| KR | 2006 0050672 A | | 5/2008 |
| WO | 98/27714 A | | 6/1998 |
| WO | 99/30521 A | | 6/1999 |
| WO | 02/089515 A1 | | 11/2002 |
| WO | 03/063536 A | | 7/2003 |

OTHER PUBLICATIONS

IP Multimedia Call Control Protocol based on SIP and SDP, 3GPP TS 24.229 V5.1.0 [online], Stage 3 (Release 5), [Retrieved on Jun. 24, 2011], Internet <URL: http://www.3gpp.orglftp/Specs/archive/24_series/24.229/24229-510,zip>, Jun. 2002.

Translation of Abstract of JP 2006-276093, published Oct. 12, 2006.

Translation of Office Action from Japanese Patent Office for corresponding Japanese Patent Application No. 2007-341450 dated Jul. 2, 2010 (3 pages).

Full Translation of KR 2006 0050672 (A) (Yu May 19, 2006).

Office Action from corresponding Korean Patent Application No. 10-2008-0001269 dated Dec. 21, 2009.

English-language translation of Office Action from corresponding Korean Patent Application No. 10-2008-0001269 dated Dec. 21, 2009.

English-language Abstract of KR 10-2005-0049151.

Abstract and partial translation of KR 2006 0050672 (A) (Yu et al. May 19, 2006).

Machine translation of JP 2006 287798 (A) (Tanimoto Oct. 19, 2006).

Machine translation JP 2006 270558 (A) (Fukada et al. Oct. 5, 2006).

Machine translation of JP 2006 080962 (A) (Higuchi et al. Mar. 23, 2006).

3GPP TSG CN Plenary Meeting #20, CRs to Rel-5 on Work Item IMS-CCR towards 24.229,—pack 7, pp. 5-6, retrieved on Nov. 5, 2006.

3GPP TSG CN Plenary Meeting #19, CRs to Rel-5 on Work Item IMS-CCR towards 24.229,—pack 2, 1 page, retrieved on Nov. 5, 2006.

3GPP TSG CN Plenary Meeting #18, CR to Rel-5 on Work Item IMS-CCR towards 24.229,—CR290r1, 1 page, retrieved on Nov. 5, 2006.

RIM Handheld OS RIM OS Software, downloads, install guides, etc., "Locked Emergency Call," http://blackberryforums.pinstack.com/11031-locked_emergenc_call.html, retrieved on Dec. 4, 2006.

User Guide, BlackBerry 7250 Wireless Handheld, BlackBerry 7250 Wireless Handheld Model Number: RAR20CN, retrieved on Nov. 29, 2006.

Firewall Support for SIP, "Cisco IOS Release 12.2(11)Yu and 12.2(5)T", p. 599, and "Cisco IOS Security Configuration Guide", p. 602, retrieved on Nov. 30, 2006.

3GPP TSG-CT1 Meeting #32; Koivusalo, Erkki, "Draft LS to CT1 on IMS Rel-5 emergency call handling", 1 page, Edinburgh, Scotland, Aug. 21-25, 2006, retrieved on Jan. 23, 2007.

3GPP TSG-CT1 Meeting #43, Mayer, Georg, "IMS Rel-5 emergency call handling", 2 pages, Da Lian, China, Aug. 28-Sep. 1, 2006, retrieved on Dec. 14, 2006.

3RD Generation Partnership Project; Technical Specification Group Services and System Aspects; 3GPP TS 23.167 v7.3.0; IP Multimedia Subsystem (IMS) emergency sessions (Release 7); Dec. 2006, pp. 1-34, XP002435698 http://www.3gpp.org/ftp/Specs/archive/23_series/23.167/23167-730.zip.

European Patent Office Examination Report issued in corresponding EP application No. 07100192.9 dated Mar. 5, 2012, 6 pgs.

3GPP TS 24.229 v7.6.0 (2006-12), 3rd Generation Partnership Project; Technical Specification Group Core Network and Terminals; IP multimedia call control protocol based on Session Initiation Protocol (SIP) and Session Description Protocol (SDP); Stage 3 (Release 7), 401 pgs.

* cited by examiner

SYSTEM AND METHOD FOR CONDITIONALLY ATTEMPTING AN EMERGENCY CALL SETUP

This application is a continuation of U.S. application Ser. No. 11/620,320, filed Jan. 5, 2007 now U.S. Pat. No. 8,041,331, which is incorporated herein by reference.

FIELD OF THE APPLICATION

The application relates to electronic communication, and more particularly to emergency call setups for communication devices.

BACKGROUND

According to Section 5.1.6 of TS 24.229, version 5, upon a mobile device receiving a 380 (Alternative Service) response with a <type> child element set to "emergency", the mobile device is to automatically attempt an emergency call setup over the CS domain. If the emergency call setup is successful, then an emergency call is established for the mobile device. The mobile device normally receives the 380 response in response to transmitting an invite request message to the network. Therefore, by transmitting the invite request message, the mobile device can trigger the process of establishing an emergency call in the event that there is an emergency.

BRIEF DESCRIPTION OF THE DRAWINGS

Embodiments will now be described with reference to the attached drawings in which.

DETAILED DESCRIPTION OF EMBODIMENTS

Figure 1A:
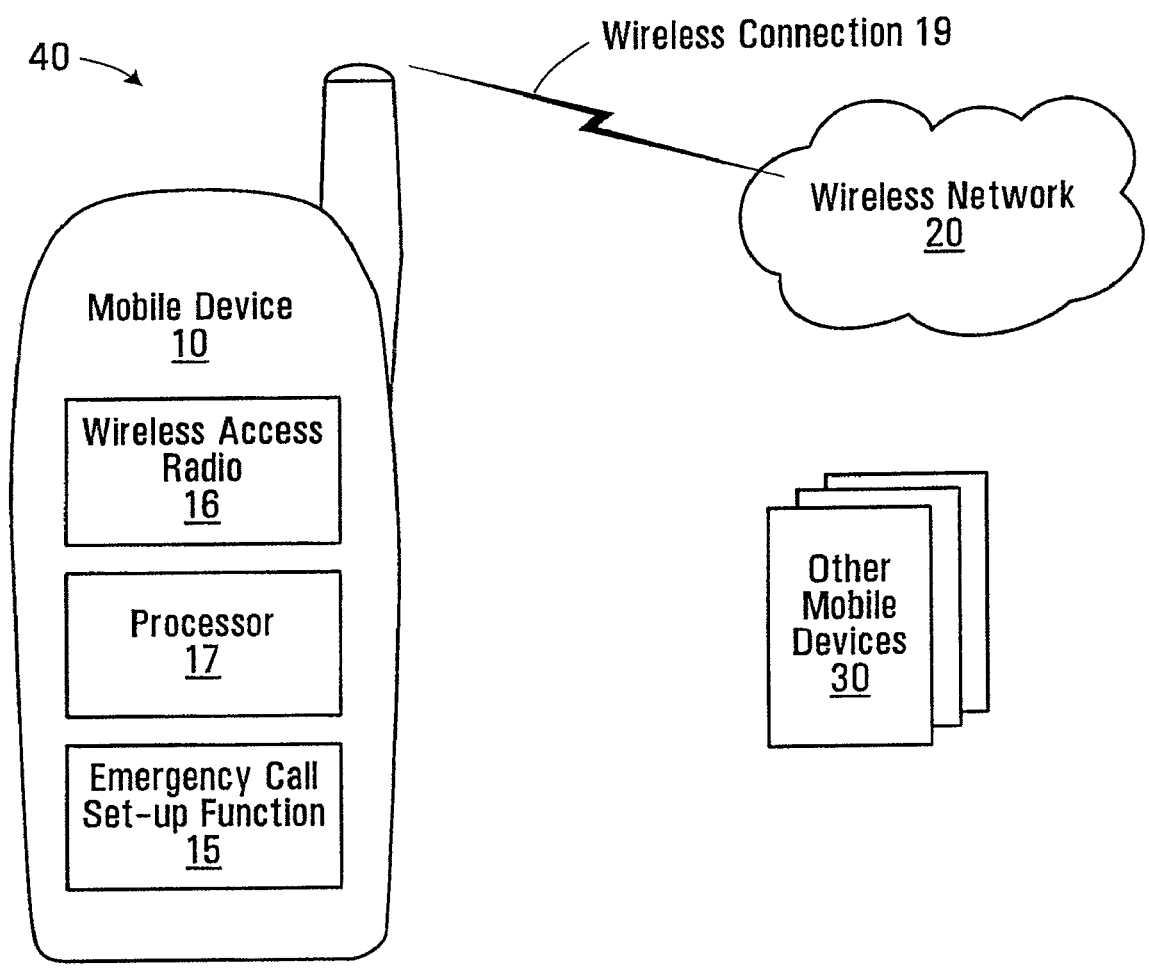
FIG. 1A is a block diagram of an example communication system.

As noted above, a mobile device can trigger the process of establishing an emergency call when there is an emergency. However, Section 5.1.6 of TS 24.229, version 5, also allows for the possibility that the mobile device establishes an emergency call when there is not an emergency. For instance, an entity can send a 380 (Alternative Service) response with the <type> child element set to "emergency" to the mobile device thereby prompting the mobile device to automatically attempt an emergency call setup. The entity might be a rogue mobile device, a mobile device with a faulty protocol implementation, or a rogue server. In this situation, the mobile device would automatically attempt an emergency call setup even though there might be no apparent emergency. SIP messages with a number 3xx—where "xx" stands for 2 digits—mean redirection and they might be sent by a rogue or faulty mobile device or server.

According to a broad aspect, there is provided a method in a mobile device comprising: maintaining at least one condition for attempting emergency call setups; receiving a message prompting an emergency call setup; and in response to receiving the message prompting the emergency call setup, attempting the emergency call setup only if any of the at least one conditions is satisfied.

According to another broad aspect, there is provided a computer readable medium having computer executable instructions stored thereon for execution on a processor so as to implement the method summarized above.

According to another broad aspect, there is provided a mobile device comprising: a wireless access radio; and an emergency call setup function adapted to: (a) maintain at least one condition for attempting emergency call setups; (b) receive a message prompting an emergency call setup; and (c) in response to receiving the message prompting the emergency call setup, attempt the emergency call setup only if any of the at least one conditions is satisfied.

According to another broad aspect, there is provided a method in a communications network comprising: maintaining at least one condition for forwarding messages that prompt a target communications device to attempt an emergency call setup; receiving a message that prompts a target communications device to attempt an emergency call setup; and forwarding the message along a signaling data path only if any of the at least one conditions is satisfied.

According to another broad aspect, there is provided a computer-readable medium having computer executable instructions stored thereon for execution on a processor so as to implement the method summarized above.

According to another broad aspect, there is provided a communications network comprising a message-blocking function operable to: maintain at least one condition for forwarding messages that prompt a target communications device to attempt an emergency call setup; receive a message that prompts a target communications device to attempt an emergency call setup; and forward the message along a signaling data path only if any of the at least one conditions is satisfied.

According to another broad aspect, there is provided a method in a communications network comprising: receiving messages, each message being directed at a respective target communications device for prompting the target communications device to attempt an emergency call setup; and for each message, blocking the message from being forwarded along a signaling data path.

According to another broad aspect, there is provided a computer-readable medium having computer-executable instructions stored thereon for execution on a processor so as to implement the method summarized above.

According to another broad aspect, there is provided a communications network comprising a message-blocking function operable to: receive messages, each message being directed at a respective target communications device for prompting the target communications device to attempt an emergency call setup; and for each message, block the message from being forwarded along a signaling data path.

Conditional Emergency Call Setup: Communication System

Referring now to FIG. 1A, shown is a block diagram of an example communication system 40. The communication system 40 has a wireless network 20, a mobile device 10, and other mobile devices 30; the communication system 40 may have other components, but they are not shown for the sake of simplicity. The mobile device 10 has a wireless access radio 16, a processor 17, and an emergency call setup function 15; the mobile device 10 may have other components, but they are not shown for the sake of simplicity. The other mobile devices 30 may each have components similar to those of the mobile device 10. Alternatively, some or all of the other mobile devices 30 may have different components than those of the mobile device 10.

In operation, the mobile device 10 communicates with the wireless network 20 using its wireless access radio 16. The wireless communication is over a wireless connection 19 between the mobile device 10 and the wireless network 20. The other mobile devices 30 may similarly communicate with the wireless network 20 over respective wireless connections (not shown). The communication with the wireless network 20 might for example be telephony, or other forms of communication such as email.

Some communication might include emergency calls. For instance, the mobile device 10 might attempt an emergency call upon receiving a message prompting an emergency call setup. The source of the message prompting the emergency call setup might for example be one of the other mobile devices 30, or the wireless network 20 itself. In the event that the source of the message is one of the other mobile devices 30, then the source might be a rogue mobile device attempting to trigger the mobile device 10 to attempt an emergency call setup even though there may be no apparent emergency. There may be other situations in which the mobile device 10 receives a message prompting an emergency call setup when there is no apparent emergency.

According to an embodiment of the application, the emergency call setup function 15 maintains at least one condition for attempting emergency call setups. Upon receiving a message prompting an emergency call setup, the emergency call setup is attempted only if any of the at least one conditions is satisfied. This allows the mobile device 10 to disregard a message prompting an emergency call setup in the event that there is no need to set up an emergency call. Further details are provided with reference to FIGS. 2 through 5.

In the illustrated example, the emergency call setup function 15 is implemented as software and is executed on the processor 17. However, more generally, the emergency call setup function 15 may be implemented as software, hardware, firmware, or any appropriate combination thereof.

In the illustrated example, the communication devices 10, 30 are assumed to be mobile devices. However, more generally, embodiments of the application may be applicable to communication devices, which may be mobile or wired. For wired devices, there is no need for a wireless access radio. Rather, wired devices may be provided with any appropriate communications interface. For the case of wired devices, the network 20 need not be wireless.

The wireless network 20 is not shown with any specific components. However, it is to be understood that the wireless network 20 would have any appropriate components suitable for a wired and/or wireless network. The components are implementation specific and may depend on the type of network. The network 20 may be of any appropriate type, for example GPRS, UMTS, CDMA etc. IMS services are bearer-agnostic. In some implementations, the wireless network 20 includes P-CSCF (Proxy Call Session Control Function) nodes for processing transmission of SIP messages. Other implementations are possible.

Figure 1B:
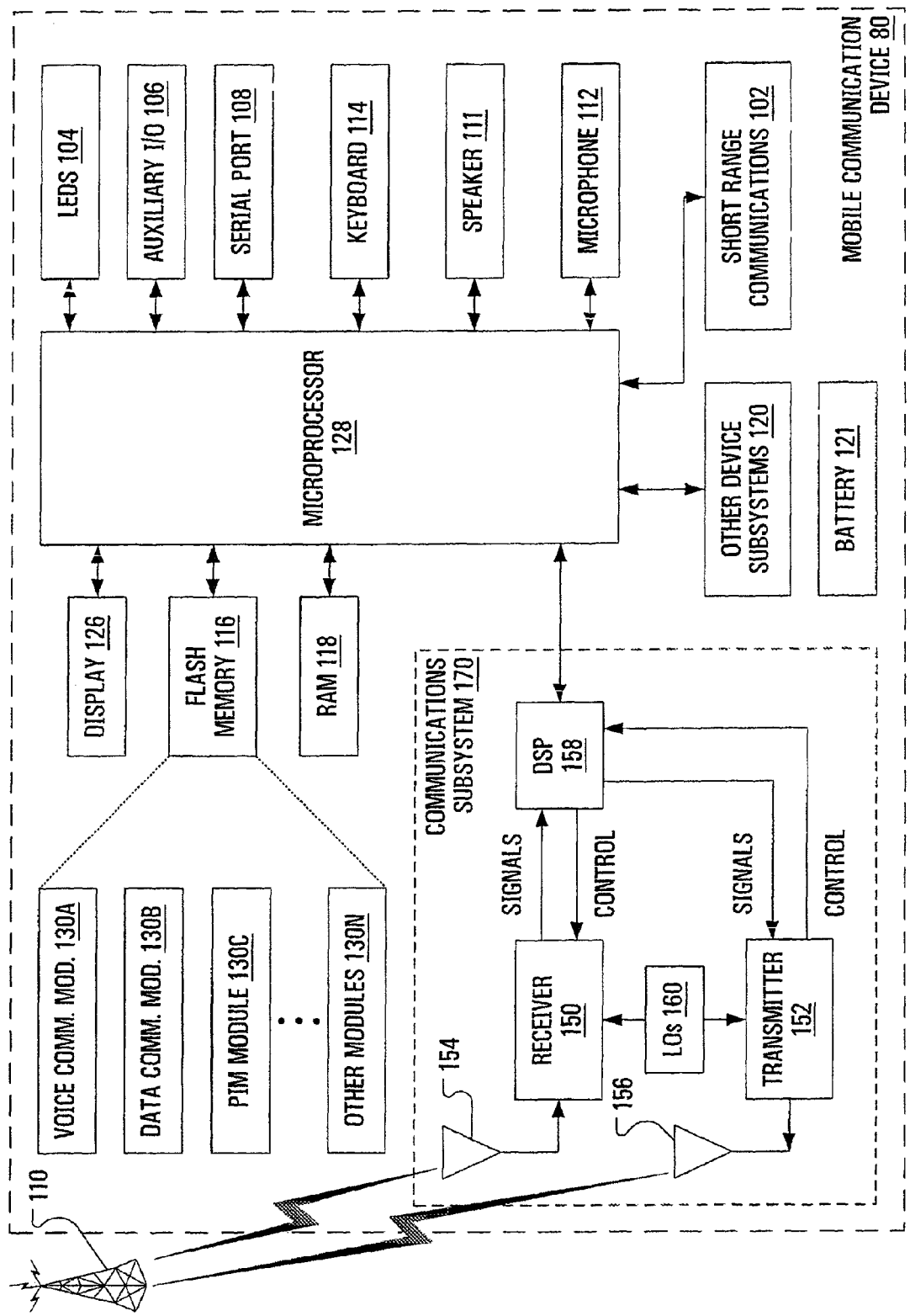
FIG. 1B is a block diagram of a mobile device.

Referring now to FIG. 1B, shown is a block diagram of another mobile device 80 that may implement any of the methods described herein. The mobile device 80 is shown with specific components for implementing features similar to those of the mobile device 10 of FIG. 1A. It is to be understood that the mobile device 80 is shown with very specific details for example purposes only.

A processing device (a microprocessor 128) is shown schematically as coupled between a keyboard 114 and a display 126. The microprocessor 128 is a type of processor with features similar to those of the processor 17 of the mobile device 10 shown in FIG. 1A. The microprocessor 128 controls operation of the display 126, as well as overall operation of the mobile device 80, in response to actuation of keys on the keyboard 114 by a user.

The mobile device 80 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 80 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 80 may have a battery 121 to power the active elements of the mobile device 80. The mobile device 80 is in some embodiments a two way radio frequency (RF) communication device having voice and data communication capabilities. In addition, the mobile device 80 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 80 may also be stored to the RAM 118.

The microprocessor 128, in addition to its operating system functions, enables execution of software applications on the mobile device 80. A predetermined set of software applications that control basic device operations, such as a voice communications module 130A and a data communications module 130B, may be installed on the mobile device 80 during manufacture. In addition, a personal information manager (PIM) application module 130C may also be installed on the mobile device 80 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A, 130B, 130C, 130N of the flash memory 116 can be configured for implementing features similar to those of the emergency call setup function 15 of the mobile device 10 shown in FIG. 1A. For example, one of the other modules 130N can be configured so that when it is executed on the microprocessor 128, the mobile device 80 maintains at least one condition for attempting emergency call setups. In response to receiving a message prompting an emergency call setup, the mobile device 80 attempts the emergency call setup only if any of the at least one conditions is satisfied. There may be provided video-calling capability in addition to voice-calling capability.

Communication functions, including data and voice communications, are performed through the communication subsystem 170, and possibly through the short range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 16 of the mobile device 10 shown in FIG. 1A. The specific design and implementation of the communication subsystem 170 is dependent upon the communication network in which the mobile device 80 is intended to operate. For example, the communication subsystem 170 of the mobile device 80 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 80.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 80 may send and receive communication signals over the communication network 110. Signals received from the communication network 110 by the receive antenna 154 are routed to the receiver 150, which provides for signal amplification, frequency down conversion, filtering, channel selection, etc., and may also provide analog-to-digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 80. In addition, the display 126 may also be utilized in voice communication mode, for example, to display the identity of a calling party, the duration of a voice call, or other voice call-related information.

The short-range communications subsystem 102 enables communication between the mobile device 80 and other proximate systems or devices, which need not necessarily be similar devices. For example, the short-range communications subsystem 102 may include an infrared device and associated circuits and components, or a Bluetooth™ communication module to provide for communication with similarly enabled systems and devices.

Conditional Emergency Call Setup: Device Methods

Figure 2:
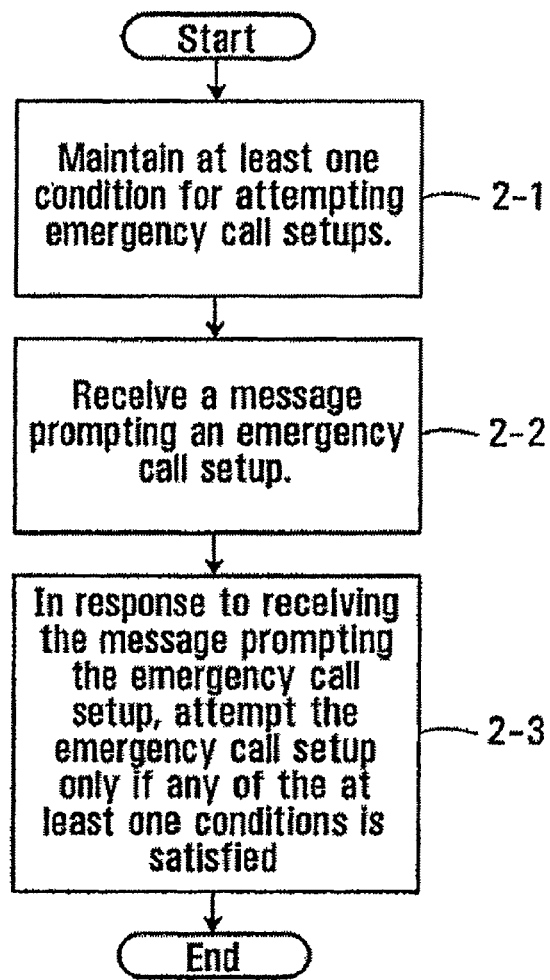
FIG. 2 is a flowchart of an example method of conditionally attempting an emergency call setup.

Referring now to FIG. 2, shown is a flowchart of an example method of conditionally attempting an emergency call setup. This method may be implemented in a communications device, for example by the emergency call setup function 15 of the mobile device 10 shown in FIG. 1A. Alternatively, the method may be implemented in the mobile device 80 shown in FIG. 1B. More generally, the method may be implemented in any appropriate communications device.

At step 2-1, the communications device maintains at least one condition for attempting emergency call setups. At step 2-2, the communications device receives a message prompting an emergency call setup. At step 2-3, in response to receiving the message prompting the emergency call setup, the communications device attempts the emergency call setup only if any of the at least one conditions is satisfied. Otherwise, the communications device does not attempt the emergency call setup.

There are many possibilities for the message prompting the emergency call setup. In some implementations, the message is a 380 alternative service message that prompts the emergency call setup. The 380 alternative service message might prompt the emergency call setup for example by having an XML (Extensible Markup Language) body that includes an <alternative service> element with the <type> child element set to "emergency". Alternatively, the 380 alternative service message might prompt the emergency call setup using any other type of encoding. More generally, the message may be any message that prompts an emergency call setup.

There are many possibilities for the at least one condition. The at least one condition includes one or more conditions, at least one of which is to be satisfied for attempting an emergency call setup. Since there are many possibilities for the at least one condition, it follows that there are many possibilities for attempting the emergency call setup only if any of the at least one conditions is satisfied. There may be many configurations for the at least one condition. Satisfying a given condition can be any Boolean function of these configurations. To illustrate this point, further examples are provided below with reference to FIGS. 3 through 6. It is to be understood that these further examples are a mere sample of the possibilities.

Referring now to FIGS. 3 through 6, shown are flowcharts of other example methods of conditionally attempting an emergency call setup. These methods may be implemented in a communications device, for example by the emergency call setup function 15 of the mobile device 10 shown in FIG. 1A. Alternatively, these methods may be implemented in the mobile device 80 shown in FIG. 1B. More generally, these methods may be implemented in any appropriate communications device. These methods may be implemented separately, or in any appropriate combination.

Figure 3:
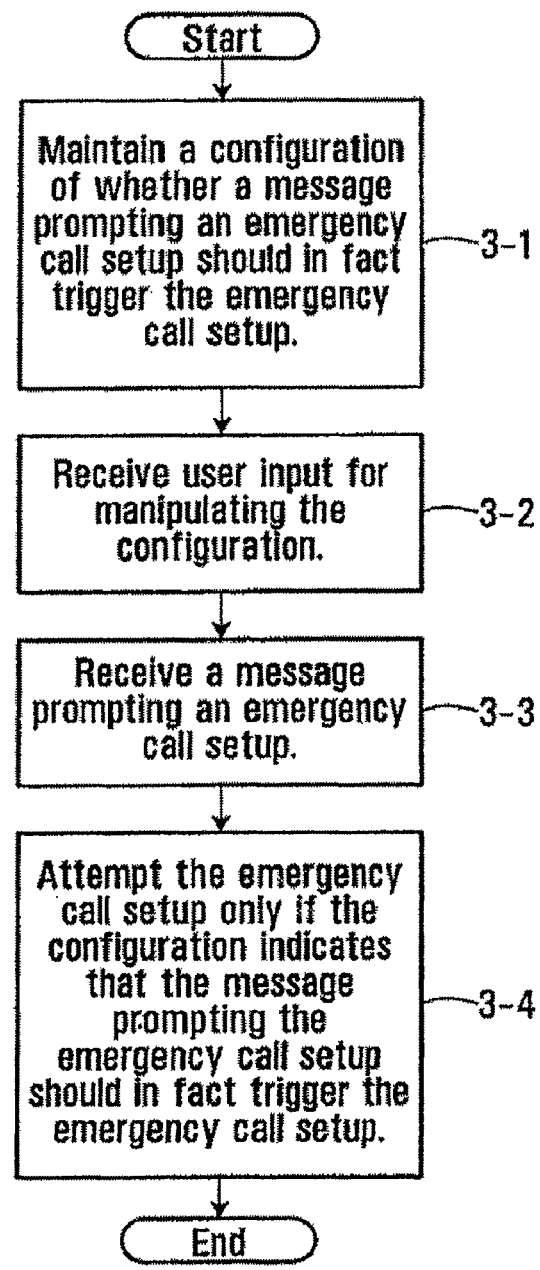
FIGS. 3 through 6 are flowcharts of other example methods of conditionally attempting an emergency call setup.

Referring first to FIG. 3, at step 3-1, the communications device maintains a configuration of whether a message prompting an emergency call setup should in fact trigger the emergency call setup. In some implementations, as shown in step 3-2, the communications device receives user input for manipulating the configuration. This may for example be accomplished through a user interface of the communications device. At step 3-3, the communications device receives a message prompting an emergency call setup. At step 3-4, the communications device attempts the emergency call setup only if the configuration indicates that the message prompting the emergency call setup should in fact trigger the emergency call setup. Otherwise, the communications device does not attempt the emergency call setup. Therefore, the condition is that the configuration indicates that the message prompting the emergency call setup should in fact trigger the emergency call setup.

In the illustrated example, the communications device receives user input for manipulating the configuration. This provides the user with the ability to specify whether messages prompting an emergency call setup should in fact trigger the emergency call setup. In some implementations, the user can manipulate the configuration at any appropriate time. Note that there does not need to be any user input even though the user may be provided with the opportunity to provide user input. In other implementations, the configuration is non-configurable by the user. The configuration may be non-configurable for example by being hard-coded. Other implementations are possible.

In another implementation, the communications device receives network input for manipulating the configuration. This allows the configuration to be manipulated by the communications network. In another implementation, the communications device receives both user input and network input for manipulating the configuration. Other implementations are possible.

Figure 4:
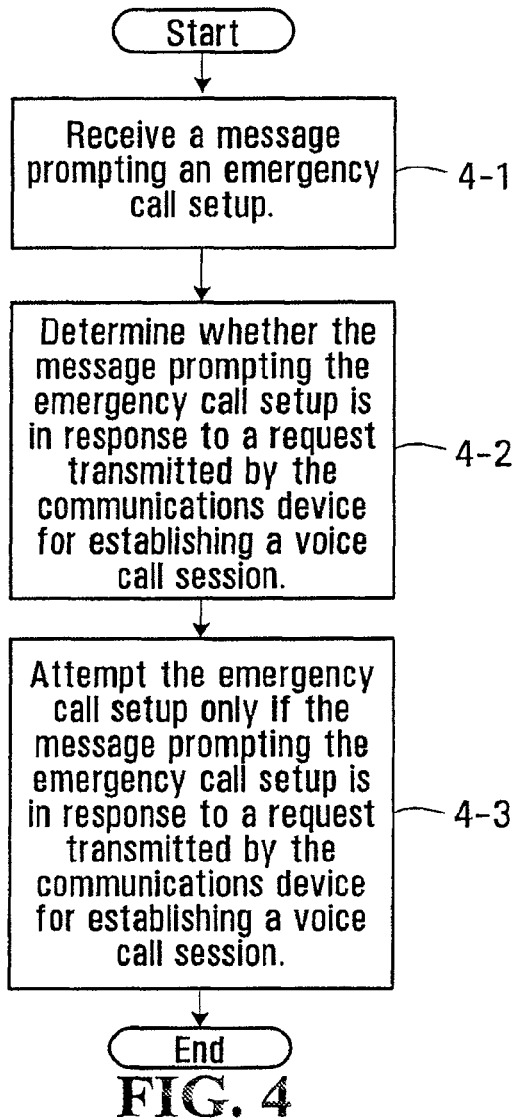

Referring now to FIG. 4, at step 4-1 the communications device receives a message prompting an emergency call setup. At step 4-2, the communications device determines whether the message prompting the emergency call setup is in response to a request transmitted by the communications device for establishing a voice call session. At step 4-3, the communications device attempts the emergency call setup only if the message prompting the emergency call setup is in response to a request transmitted by the communications device for establishing a voice call session. Otherwise, the communications device does not attempt the emergency call setup. Therefore, the condition is that the message prompting the emergency call setup is in response to a request transmitted by the communications device for establishing a voice call session. For instance, if the message prompting the emergency call setup is in response to a request transmitted by the communications device for establishing an IM (Instant Messaging) session, then the communications device does not attempt the emergency call setup.

In the illustrated example, behavior is defined for a specific type of session, namely a voice call session. However, it is to be understood that behavior may be defined for other types of communication sessions, for example a video call session. In another implementation, the communications device determines whether the message prompting the emergency call setup is in response to a request transmitted by the communications device for establishing a video call session. According to this implementation, the communications device attempts the emergency call setup only if the message prompting the emergency call setup is in response to a request transmitted by the communications device for establishing a video call session.

In the example presented above with reference to FIG. 4, the communications device might assume that IM session services should not be redirected to an emergency number. In some implementations, the communications device maintains an identification of services that can be redirected to an emergency number. An example of this is provided below with reference to FIG. 5.

Figure 5:
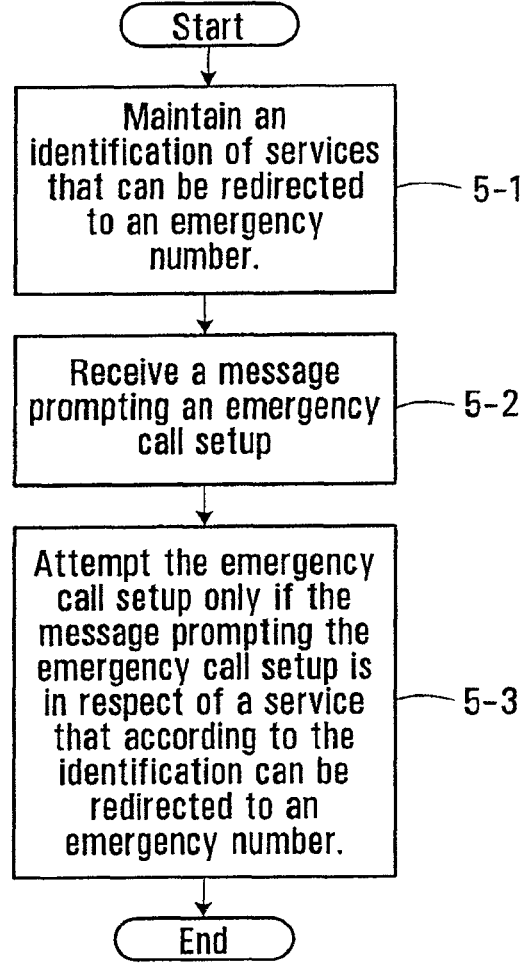

Referring now to FIG. 5, at step 5-1, the communications device maintains an identification of services that can be redirected to an emergency number. At step 5-2, the communications device receives a message prompting an emergency call setup. At step 5-3, the communications device attempts the emergency call setup only if the message prompting the emergency call setup is in respect of a service that according to the identification can be redirected to an emergency number. Otherwise, the communications device does not attempt the emergency call setup. Therefore, the condition is that the message prompting the emergency call setup is in respect of a service that according to the identification can be redirected to an emergency number.

In some implementations, the identification of services that can be redirected to an emergency number may be configurable by the user. In other implementations, the identification of services that can be redirected to an emergency number is non-configurable. The configuration may be non-configurable for example by being hard-coded. Other implementations are possible.

Figure 6:
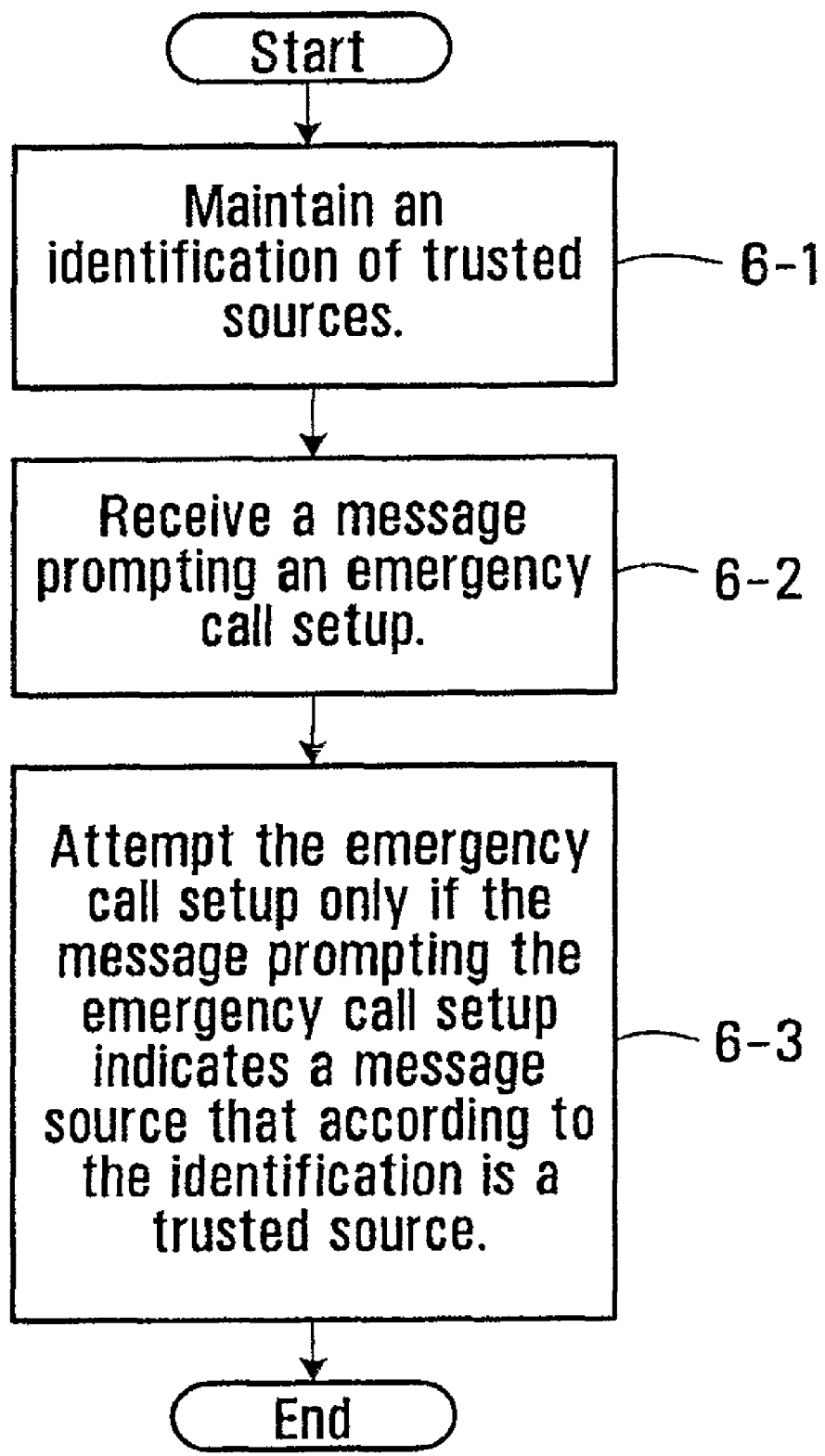

Referring now to FIG. 6, at step 6-1, the communications device maintains an identification of trusted sources. At step 6-2, the communications device receives a message prompting an emergency call setup. At step 6-3, the communications device attempts the emergency call setup only if there is indication that the message prompting the emergency call setup was sent from a message source that according to the identification is a trusted source. In some implementations, the message prompting the emergency call setup indicates a message source. In other implementations, the communications device is aware of the message source by other means. Otherwise, the communications device does not attempt the emergency call setup, as the message prompting the emergency call setup may have originated from a rogue communications device or some other rogue entity. Therefore, the condition is that the message prompting the emergency call setup indicates a message source that according to the identification is a trusted source.

According to the example presented above with reference to FIG. 6, the message prompting the emergency call setup may be provided with an identification of the message source, which allows a determination of whether to trust the message source. More generally, embodiments of the application are applicable to any SIP message, as there may be other SIP messages received from unknown sources. Such SIP messages might cause other undesirable situations aside from prompting an emergency call setup. Appropriate authentication can be performed to verify the message source. Further examples are provided in the additional sections below.

In the examples presented herein, there are situations in which receiving a message prompting an emergency call setup does not trigger the communications device to attempt an emergency call setup. In some implementations, the communications device warns a user of the communications device if the emergency call setup is not attempted in response to the message prompting the emergency call setup. The warning may be issued by the communications device, for example via a user interface of the communications device.

Conditional Emergency Call Setup: Another Communication System

In the examples presented above, the communications device conditionally attempts an emergency call setup in response to receiving a message prompting the communications device to attempt an emergency call setup. In another embodiment, the communications network blocks at least some of the messages. In another embodiment, the communications network blocks at least some messages while communications devices conditionally attempt emergency call setups in response to receiving messages prompting emergency call setups.

Figure 7:
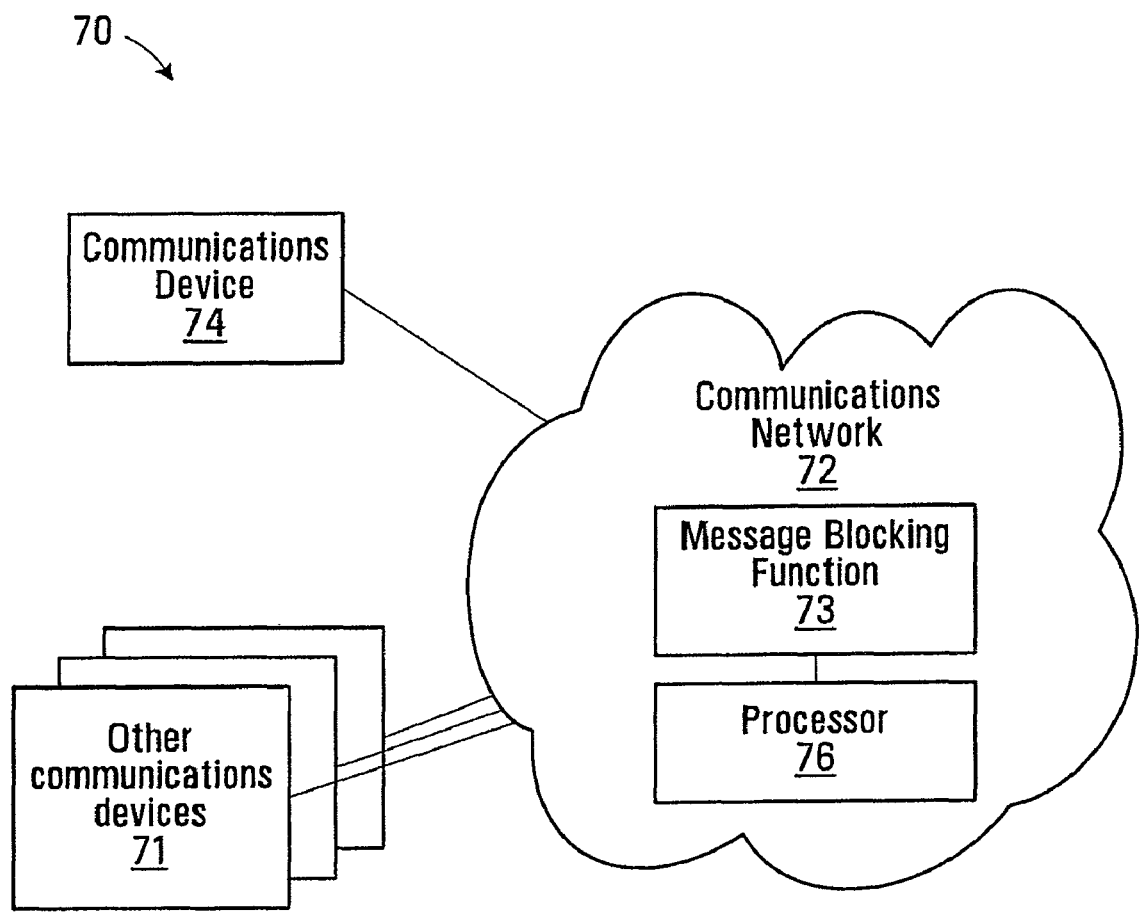
FIG. 7 is a block diagram of another communications system.

Referring now to FIG. 7, shown is a block diagram of another communications system 70. The communications system 70 has a communications network 72, which has a message-blocking function 73 coupled to a processor 76. The communications network 72 may have other components, but they are not shown for the sake of simplicity. The communications system 70 has a communications device 74, and may have other communication devices 71. The communication devices 71, 74 may each be mobile devices or wired devices. Details of the communication devices 71, 74 are omitted for the sake of simplicity. The communication system 70 may have other components, but they are not shown for the sake of simplicity.

In operation, the communication devices 71, 74 communicate over the communication network 72. The communication might for example include messages of a defined type that prompt a target communications device to attempt an emergency call setup. For example, one of the other communication devices 71 might send a message of the defined type to the communications device 74. For each message of the predefined type that is sent, the communications network 72 receives the message. According to an embodiment of the application, the message-blocking function 73 blocks at least some of the messages of the predefined type from being forwarded along a signaling data path. Further details are provided below with reference to FIGS. 8 through 10.

In the illustrated example, the message blocking function 73 is implemented as software and is executed on the processor 76. However, more generally, the message-blocking function 73 may be implemented as software, hardware, firmware, or any appropriate combination thereof. Although shown as a single component, more generally, the message-blocking function 73 may have one or more components. The one or more components may be distributed throughout the communications network 72 or located on a single network element. The one or more components may be integrated with other components of the communications network 72. In some implementations, the message-blocking function 73 includes both a message-blocking function for delivering messages to target devices, and a message-blocking function for forwarding messages to another component of the communications network 72. Other implementations are possible.

In some implementations, the communications network 72 is a wireless network. However, for the case of wired devices, the communications network 72 need not be wireless. Therefore, in other implementations, the communications network 72 is a wired network. In other implementations, the communications network 72 includes a wired network and a wireless network. Other implementations are possible.

The communications network 72 is shown without specific components. However, it is to be understood that the communications network 72 would have any appropriate components suitable for a wired and/or wireless network. The components are implementation specific and may depend on the type of network. The communications network 72 may be of any appropriate type, for example GPRS, UMTS, CDMA etc. IMS services are beareragnostic. In some implementations, the communications network 72 includes P-CSCF (Proxy Call Session Control Function) nodes for processing transmission of SIP messages. Other implementations are possible.

Conditional Emergency Call Setup: Network Methods

Figure 8:
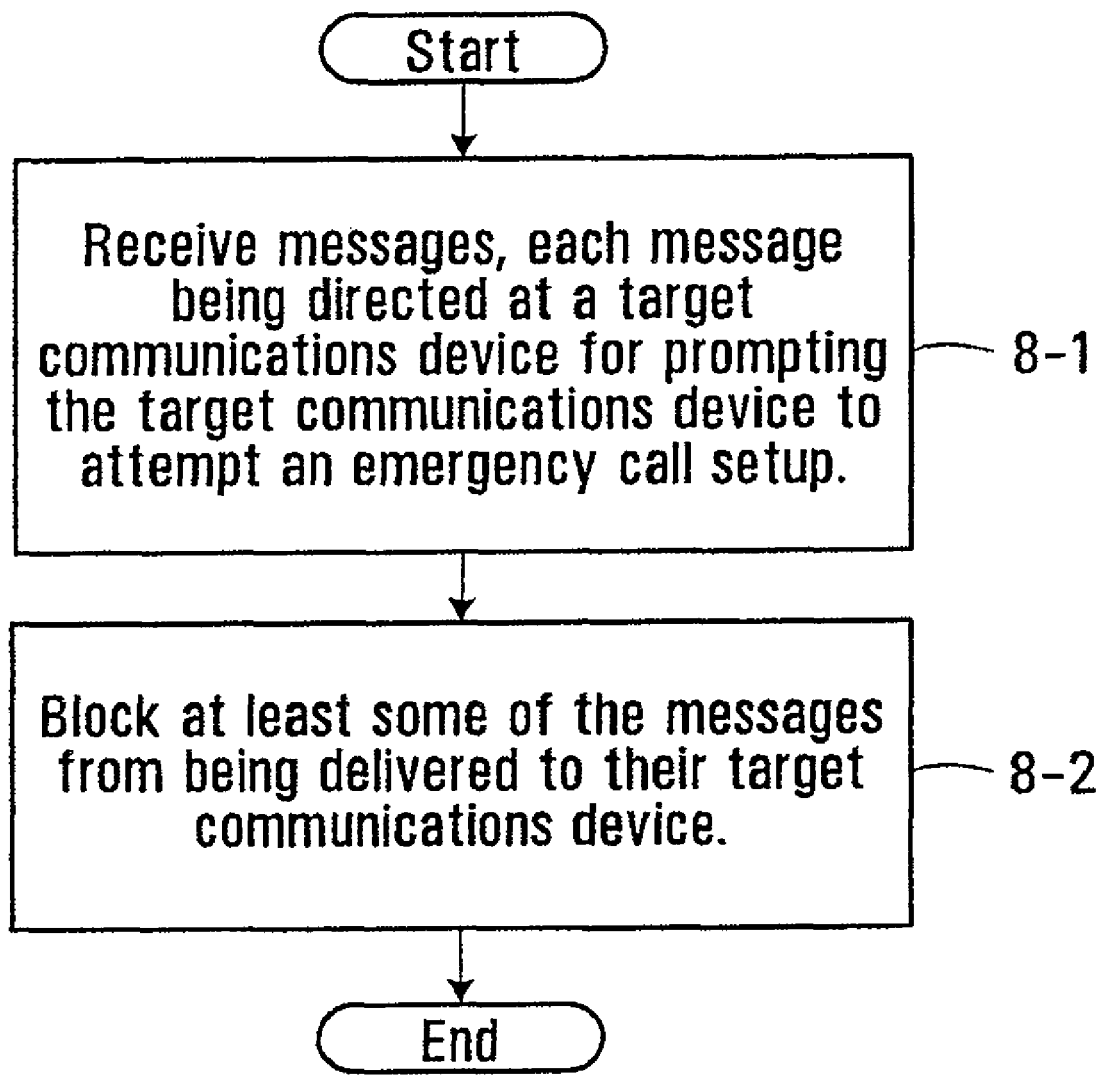
FIG. 8 is a flowchart of a method of blocking at least some messages from being delivered to their target mobile device.

Referring now to FIG. 8, shown is a flowchart of a method of blocking at least some messages from being delivered to their target communications device. This method may be implemented in a communication network, for example by the message-blocking function 73 of the communications network 72 shown in FIG. 7.

At step 8-1, the communication network receives messages, each message being directed at a target communications device for prompting the target communications device to attempt an emergency call setup. At step 8-2, the communication network blocks at least some of the messages from being delivered to their target communications device.

There are many possibilities for each message that is directed at a target communications device for prompting the target communications device to attempt an emergency call setup. Each message may be any appropriate message that prompts an emergency call setup, examples of which have been provided above.

There are many ways for the communication network to block at least some of the messages from being delivered to their target communications device. To illustrate this point, other example methods of blocking at least some of the messages from being delivered to their target communications device are provided below.

Figure 9:
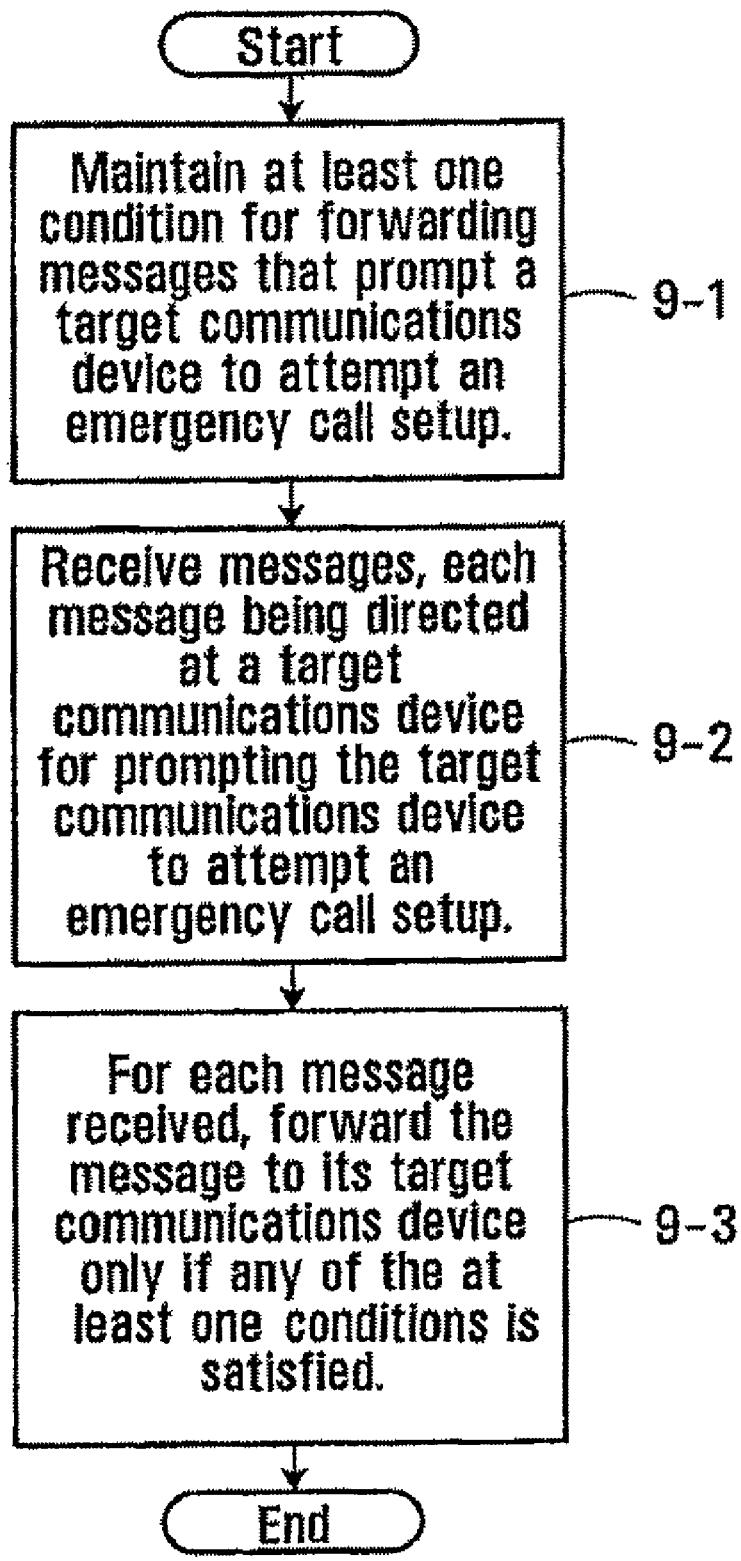
FIGS. 9 and 10 are flowcharts of other example methods of blocking at least some of the messages from being delivered to their target mobile device.
Figure 10:
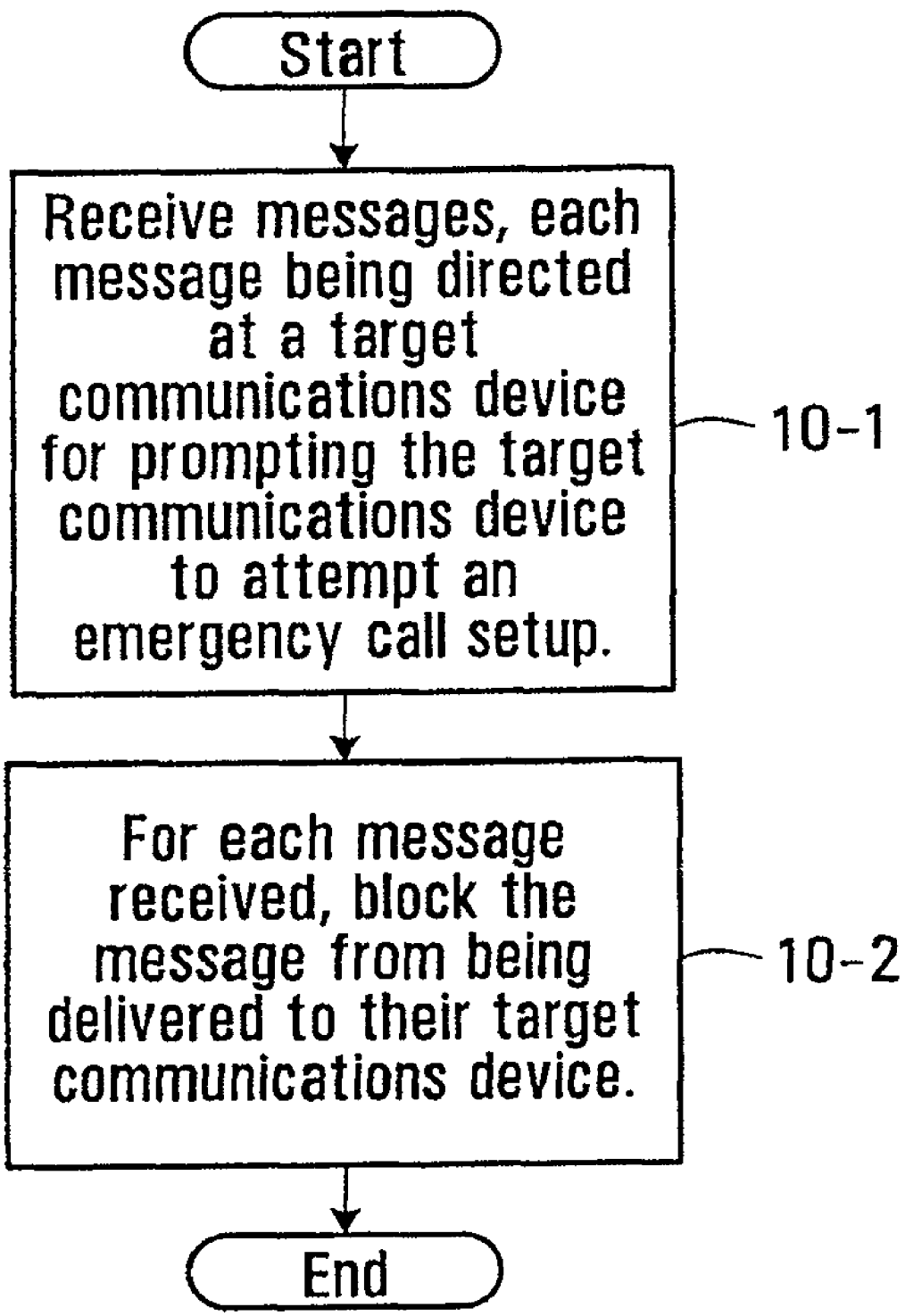

Referring now to FIGS. 9 and 10, shown are flowcharts of other example methods of blocking at least some of the messages from being delivered to their target communications device. These methods may be implemented in a communications network, for example by the message-blocking function 73 of the communications network 72 shown in FIG. 7.

Referring first to FIG. 9, at step 9-1 the communications network maintains at least one condition for forwarding messages that prompt a target communications device to attempt an emergency call setup. At step 9-2, the communications network receives messages, each message being directed at a target communications device for prompting the target communications device to attempt an emergency call setup. At step 9-3, for each message received, the communications network forwards the message to its target communications device only if any of the at least one conditions is satisfied.

There are many possibilities for maintaining at least one condition for forwarding the messages. In some implementations, the communications network maintains an identification of trusted sources. Accordingly, in some implementations, for each message received, the communications network forwards the message only if there is indication that the message was sent from a message source that according to the identification is a trusted source. In some implementations, the message prompting the emergency call setup indicates a message source. In other implementations, the communications network is aware of the message source by other means. Other implementations are possible.

In the illustrated example, the communications network forwards the message to its target communications device. In another implementation, the communications network forwards the message to a network component within the communications network. More generally, the communications network forwards the message along a signaling data path, which might involve forwarding the message to its target communications device or forwarding the message to a network component within the communications network. If forwarded to a network component, the message might be forwarded to its target communications device or forwarded to yet another network component within the communications network.

Referring now to FIG. 10, at step 10-1 the communications network receives messages, each message being directed at a target communications device for prompting the target communications device to attempt an emergency call setup. At step 10-2, for each message received, the communications network blocks all of the messages from being delivered to their target communications device.

In the illustrated example, the communications network blocks all of the messages from being delivered to their target communications device. This might be executed by a network component that is in a position to deliver messages to the target communications device, or by a network component that forwards messages to another network component in order for the communications device to receive the messages.

Numerous modifications and variations of the present application are possible in light of the above teachings. It is therefore to be understood that within the scope of the appended claims, the application may be practiced otherwise than as specifically described herein.

I claim:

1. A method performed by a mobile communications device comprising:
    maintaining an identification, which was received from a network element, of a trusted source;
    receiving a message from a Proxy Call Session Control Function (P-CSCF) prompting an emergency call setup, the message being a response message received in response to a request message from the mobile communications device;
    determining whether a message source indicated by the message is the same as the identification of the trusted source; and
    attempting the emergency call setup only if the message source indicated by the message is determined to be the same as the identification of the trusted source, wherein the message source indicated by the message is the P-CSCF.

2. The method of claim 1 wherein the message prompting the emergency call setup:
    is a 380 alternative service message.

3. The method of claim 1 wherein the request message is a Session Initiation Protocol (SIP) INVITE request.

4. A non-transitory computer readable medium having computer executable instructions stored thereon for execution on a processor so as to implement the method of claim 1.

5. A mobile communications device comprising:
    a memory configured to maintain an identification, which was received from a network element, of a trusted source;
    a communications subsystem configured to receive a message from a Proxy Call Session Control Function (P-CSCF) prompting an emergency call setup, the message being a response message received in response to a request message from the mobile communications device;
    a processor configured to determine whether a message source indicated by the message is the same as the identification of the trusted source,
    the processor being further configured to attempt the emergency call setup only if the message source indicated by the message is determined to be the same as the identification of the trusted source, wherein the message source indicated by the message is the P-CSCF.

6. The mobile communications device of claim 5 wherein the communications subsystem is a wireless access radio operable to communicate with a wireless network.

7. A communications network element comprising:
    a processor configured to send an identity of a trusted source to a mobile communication device;
    the processor being further configured to send, to the mobile communication device, a message from a Proxy Call Session Control Function (P-CSCF) that prompts an emergency call setup by said device, the message being a response message sent in response to a request message received from the mobile communications device,
    wherein the message includes an indication of a message source, the indication being usable by the mobile communication device to determine whether the message source is the same as the trusted source, wherein the message source indicated by the message is the P-CSCF.

8. The communications network element of claim 7 wherein the message:
    is a 380 alternative service message.

9. The communications network element of claim 8 wherein the processor is further configured to execute the Proxy Call Session Control Function (P-CSCF) for sending the 380 alternative service message.

10. A non-transitory computer readable medium storing instructions which cause execution of a method comprising:
    sending an identity of a trusted source to a mobile communication device; and
    sending, to the mobile communication device, a message from a Proxy Call Session Control Function (P-CSCF) prompting an emergency call setup by said device, the message being a response message sent in response to a request message received from the mobile communications device,
    wherein the message includes an indication of a message source, the indication being usable by the mobile communication device to determine whether the message source is the same as the identity of the trusted source, wherein the identity of the message source indicated by the message is the P-CSCF.

11. The non-transitory computer readable medium of claim 10 wherein the message is a 380 alternative service message.

* * * * *